J. W. HUBBLE.
TIRE CHAIN FASTENER.
APPLICATION FILED SEPT. 15, 1919.
1,362,314.
Patented Dec. 14, 1920.
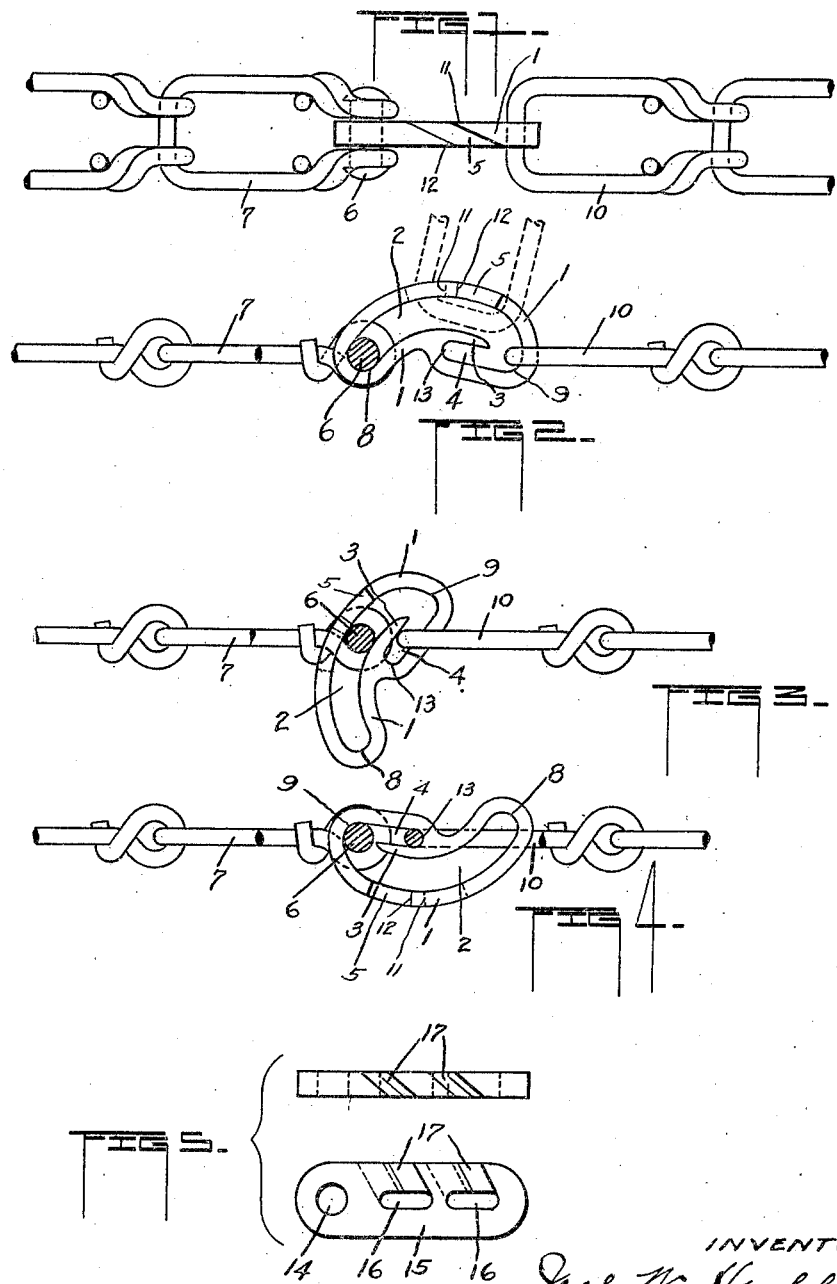
INVENTOR
Joel W. Hubble
BY
ATT'Y

UNITED STATES PATENT OFFICE.

JOEL W. HUBBLE, OF JACKSONVILLE, ILLINOIS.

TIRE-CHAIN FASTENER.

1,362,314.  Specification of Letters Patent.  Patented Dec. 14, 1920.

Application filed September 15, 1919. Serial No. 323,807.

*To all whom it may concern:*

Be it known that I, JOEL W. HUBBLE, a citizen of the United States, a resident of Jacksonville, in the county of Morgan and State of Illinois, have invented new and useful Improvements in Tire-Chain Fasteners, of which the following is a specification.

This invention has reference to a new and improved fastener for securing the ends of tire chains, when applied to automobile tires.

The principal object of this invention is to provide a fastener for tire chains that is self contained, and does not require the use of additional guards or clasps to hold same in proper relation to the tire chain after being adjusted, thereby eliminating the necessity of the usual tool for attaching and detaching fasteners of this description.

A further object of this invention is a fastener for tire chains having as one of its functions to draw up and tighten the tire chain after the ends are connected thereto, thereby reducing the tendency for the tire chain to whip itself loose from the tire when in use.

That the invention may be more fully understood, reference is had to the accompanying drawings forming a part of this description, in which:—

Figure 1 is a plan view of a fastener embodying my invention;

Fig. 2 is an elevation of Fig. 1, the dotted line illustrating the manner in which the loose end of the chain is inserted into the fastener and the appearance of same after the connection is made and the chain is ready to tighten;

Fig. 3 is an elevation similar to Fig. 2, except that the process for tightening the chain by means of the fastener, is shown about half completed;

Fig. 4 is an elevation showing the fastener as it appears after the process for tightening the chain has been completed;

Fig. 5 is an elevation and plan illustrating a modification of the fastener which does not have the chain tightening feature, but does have the same means of preventing the chain end from becoming disengaged from the fastener.

Like characters of reference denote corresponding parts throughout the figures.

Referring now to the fastener which is preferably made of a single piece, either stamped or cast, and void of the usual and well known clasp necessary in like devices now in general use, the same is made in approximately the shape of a cardioid, although somewhat flattened. This fastener has a main slot conforming to the contour of the article and extending throughout its entire length, thereby producing a continuous outer wall, except at a suitable point where the wall is provided with an obliquely arranged opening, or diagonal slot to allow for the insertion of the link at the attaching end of the chain; also a partition wall which is integral with the body of the article, is provided, producing a short slot having parallel walls and extending from its connection with the main slot for a portion of the length of the fastener, making it possible to turn the fastener in its length to shorten the distance between the fixed and attaching end of the chain to tighten and lock the same after applying the same to a tire, as I will now describe in detail.

The main body of my fastener is designated by the numeral 1; 2 indicates the main slot above referred to and extending the full length of the fastener; 3 the partition wall which separates the main slot from the short slot 4. 5 is an obliquely arranged opening or diagonal slot in the outer wall of the fastener for the insertion of the fastening or attaching end of the chain. 6 denotes a rivet or similar device by which the one end chain link 7 is permanently attached to the fastener. 8 indicates the end of the main slot 2, at which point the rivet 6 of the link 7 is preferably located, when it is desired to connect the chain ends. 9 designates the end of the main slot 2, which is preferably toward the attaching end of the end chain link 10.

Referring to the obliquely arranged opening or diagonal slot 5, see Figs. 1 and 2, it is obvious that by this type of construction, where the points 11 and 12 formed by the slot 5 overlap each other, transversely across the outer edge of the fastener, that after the link 10 is inserted into the fastener and assumes the position shown in Fig. 1, that should the link 10 travel past the slot 5, the overlapping points 11 and 12 will form a continuous guard, preventing the link 10 passing out of the fastener through the slot 5 unless twisted intentionally into the position shown by dotted lines in Fig. 2. This construction also forms a smooth and uninterrupted path or guard, which prevents the link 10 or the rivet 8 from catching during any passage they may have along the main slot 5.

In operation, the chain is first passed around the tire and the end attaching link 10 is inserted into the main slot 2 of the fastener, by twisting or turning said link as illustrated by the dotted lines in Fig. 2, and passing through the oblique opening or diagonal slot 5. It is then drawn into the position shown in full lines in Fig. 2, and is ready for its position to be reversed end for end to draw up and tighten the tire chain. This is accomplished by clasping the fastener with the fingers and rotating the same as shown in Fig. 3. It will be understood that the necessary slack in the chain that permits of the attaching of the end attaching link 10 to the fastener, will permit the operator to easily rotate the fastener 1 to such position that he will have a powerful leverage on the tire chain with the fastener before the actual tightening occurs. By reference to Fig. 3, it will be obvious that as the fastener is rotated, the rivet 6 of the end link 7 leaves its position at the point 8 of the main slot 2 and travels therein toward the point 9 of the main slot 2, and that simultaneously, the end attaching link 10 will leave the point 9 of the main slot 2 and travel within the short slot 4 toward the end 13 thereof. As the fastener is further rotated to the position shown in Fig. 4, it may be easily seen that the rotation of the fastener has transposed the position of the rivet 6 at the point 8 of the main slot 2, to the point 9 of the main slot 2, which was occupied by the link 10 in Fig. 2, and that the link 10 has moved to the point 13 of the short slot 4, thereby decreasing the distance between the rivet 6 of the link 7 and the end attaching link 10 of the tire chain and tighten the chain around the tire. Further, the movement of the fastener which transposes the rivet pin 6 from the end of the fastener 8 to the end 9 and the seating of the end link 10 in the slot 4, so positions the rivet pin 6 in front of the open end of said slot 4 as to lock the link 10 in said slot and retain it in this position until the fastener is reversed to the position, shown in Fig. 1.

Referring to the modifications of the fastener, shown in Fig. 5, it is obvious that with this type of construction, that this fastener will possess all of the advantages relative to securely locking the tire chain after connecting the same, but that it does not have the taking up or tightening features of the fastener shown in Figs. 1, 2, 3 and 4. The manner of inserting the attaching link is similar to that described above, as well as the permanent attachment of the end tire chain link by means of a rivet, not shown, in the hole or opening 14 of the fastener 15, see Fig. 5. The slots 16 in the fastener 15 communicate with the oblique openings or diagonal slots 17 for the insertion of the attaching link, and it is obvious that after the attaching link is placed in one of the slots 16, that it will be impossible to remove the same without turning or twisting the same, as described above.

What I claim is:—

1. A one piece fastener for tire chains, having a receiving slot for the attaching link and a diagonally disposed opening through which a chain link, when turned at an angle, may be inserted into said slot.

2. A one piece fastener for tire chains, having a receiving slot for the attaching link and a diagonally disposed opening through which a chain link, when turned at an angle, may be inserted into said slot, the walls of said diagonal opening overlapping to protect the link from accidental detachment.

3. A one piece fastener for tire chains, having approximately the shape of a flattened cardioid and formed with a main slot conforming to the contour of the fastener, which communicates with a short returned slot separated from the main slot by a partition, the outer wall of said fastener provided with a diagonal disposed opening through which a chain link, when turned at an angle, may be inserted into said main slot.

4. In a tire chain, a fastener having approximately the shape of a flattened cardioid and formed with a main slot conforming to the contour of the fastener, which communicates with a short returned slot separated from the main slot by a partition, the outer wall of said fastener provided with a diagonally disposed opening, through which a chain link, when turned at an angle, may be inserted into said main slot, a rivet pin securing one end link of the chain to said fastener and movable from end to end of the main slot in the fastener, the distance between the two ends of the chain being shortened by turning the fastener end for end, resulting in the attaching link of the chain becoming seated in the end of the short slot.

5. In a tire chain, a fastener and tightener for the chain, comprising a member of one piece formed with one main slot, a short slot communicating therewith, and the wall of the member being provided with a diagonally disposed opening through which the link at the free end of the chain, when turned at an angle, may be inserted into said main slot, a rivet pin connecting the link at the opposite end of the chain to said member, said rivet pin adapted to be transposed from one end of said main slot to the other end thereof, and the link at the attaching end of the chain adapted to be seated in said short slot by the turning of said member, thereby tightening the chain.

6. In a tire chain, a fastener having a main slot extending the length thereof and a short slot communicating therewith and separated therefrom by a partition wall, the outside wall of the main slot provided with a diagonally disposed opening for the insertion of the link at the attaching end of the chain, a rivet pin through said main slot, movable therein and securing one of the chain links to said fastener, the tightening of the chain being accomplished by turning the fastener end for end, transposing the position of said rivet in said main slot, and causing the link at the attaching end of the chain to pass from the main slot into said short slot, thereby shortening the distance between the two ends of the chain.

7. In a tire chain, a one piece fastener, means connecting one end of said chain with said fastener, means permitting the link at the attaching end of said chain to be coupled to said fastener, means permitting the fastened end of the chain to be transposed from one end of said fastener to the other end thereof by the turning of the fastener, and means in the fastener to receive the coupling link of the chain during the turning thereof, whereby the distance between the ends of the chains may be shortened and the chain tightened.

In witness whereof I have hereunto affixed my hand and seal this 3rd day of September, 1919.

JOEL W. HUBBLE.